(No Model.)

H. BÖHMER.
STRAW CUTTER.

No. 414,969. Patented Nov. 12, 1889.

Witnesses
Geo. W. Young,
N. E. Oliphant

Inventor
Henry Böhmer
By Stout & Underwood
Attorneys

UNITED STATES PATENT OFFICE.

HENRY BÖHMER, OF MAYVILLE, WISCONSIN.

STRAW-CUTTER.

SPECIFICATION forming part of Letters Patent No. 414,969, dated November 12, 1889.

Application filed January 26, 1889. Serial No. 297,655. (No model.)

*To all whom it may concern:*

Be it known that I, HENRY BÖHMER, of Mayville, in the county of Dodge, and in the State of Wisconsin, have invented certain new and useful Improvements in Straw-Cutters; and I do hereby declare that the following is a full, clear, and exact description thereof.

My invention relates to straw-cutters; and it consists in certain peculiarities of construction and combination of parts to be hereinafter described with reference to the accompanying drawings and subsequently claimed.

Figure 1:
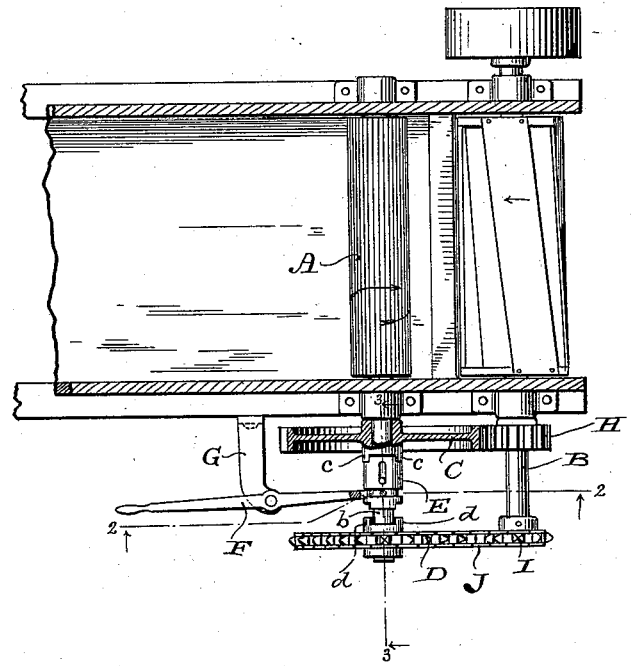
Figure 2:
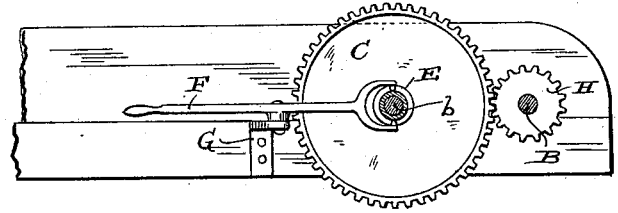
Figure 3:
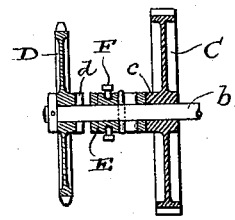

In the drawings, Figure 1 represents a plan view of a portion of a straw-cutter and illustrates the application of my invention; Fig. 2, a section on line 2 2 of Fig. 1, and Fig. 3 a section on line 3 3 of Fig. 1.

Referring by letter to the drawings, A represents the lower feed-roller, and B the drive-shaft, of an ordinary straw-cutter. Loose on the journal *b* of the feed-roller A is a gear-wheel C and a sprocket-wheel D, respectively provided with clutch members *c d*, and splined on said journal between the gear and sprocket wheels is a double clutch member E, having a spanner-connection with a lever F, the latter being pivotally connected to a bracket G, that extends outward from the frame of the machine. Fast on the shaft B are a pinion H and sprocket-wheel I, the pinion being arranged to mesh with the gear-wheel C, while the sprocket-wheel is connected by a drive-chain J with the aforesaid sprocket-wheel D, said shaft being driven by any suitable power. When the clutch members E *c* are in engagement, power will be communicated to the feed-roller A through the pinion H and gear-wheel C, and consequently the revolution of said feed-roller is in opposition to that of the knife-cylinder on the drive-shaft B, and the material is being fed toward the cutting-point. During the operation just described the sprocket-wheel D runs idle on the journal *b* of the feed-roller. To reverse the motion of the feed-roller, the clutch member E is thrown into engagement with the clutch *d*, and thus said feed-roller is actuated by the sprocket-gear to revolve in the same direction as the drive-shaft, and the gear-wheel C is run idle in the contrary direction. In case the clutch member E is not in engagement with either of the clutch members *c d*, the gear-wheel C and sprocket-wheel D will run idle in contrary directions and the feed-roller A will stand still.

By the above description it will be seen that I provide a very simple reverse-gear and do away with the variety of cog-wheels ordinarily employed for the purpose of reversing the motion or stopping the revolution of the lower feed-rollers in straw-cutters.

Having thus fully described my invention, what I claim as new, and desire to secure by Letters Patent, is—

1. In a straw-cutter, the combination, with the lower feed-roller and drive-shaft, of a gear-wheel and sprocket-wheel loose on a journal of the feed-roller and having their opposing sides respectively provided with a clutch member, a double clutch member splined on said journal between the gear and sprocket wheels, a lever for actuating the latter clutch member, a pinion fast on the drive-shaft to mesh with said gear-wheel, a sprocket-wheel also fast on the drive-shaft, and a drive-chain connecting the two sprocket-wheels, substantially as set forth.

2. In a straw-cutter, the combination, with the lower feed-roller and drive-shaft, of a gear-wheel and sprocket-wheel loose on a journal of the feed-roller and having their opposing sides respectively provided with a clutch member, a double clutch member splined on said journal between the gear and sprocket wheels, a bracket extended outward from the machine-frame, a lever pivotally connected to the bracket and coupled to the double clutch member, a pinion fast on the drive-shaft to mesh with said gear-wheel, a sprocket-wheel also fast on said drive-shaft, and a drive-chain connecting the two sprocket-wheels, substantially as set forth.

3. In a straw-cutter, the combination of a drive-shaft, a pinion and sprocket-wheel fast on the drive-shaft, a counter-shaft having a feed-roller fast thereon, a gear-wheel and sprocket-wheel loose on the latter shaft and having their opposing faces provided with clutch members, a lever-actuated double clutch member splined on the counter-shaft between the gear and sprocket wheels, and a drive-chain arranged on said sprocket-wheels, substantially as set forth.

In testimony that I claim the foregoing I have hereunto set my hand, at Mayville, in the county of Dodge and State of Wisconsin, in the presence of two witnesses.

HENRY BÖHMER

Witnesses:
ALOUIS BOEHMER,
E. H. BRUEDERLE.